(12) United States Patent
Wei

(10) Patent No.: US 7,001,002 B2
(45) Date of Patent: Feb. 21, 2006

(54) RETENTION DEVICE FOR EXPANSION CARDS

(75) Inventor: Juan Wei, Shenzhen (CN)

(73) Assignee: Hon Hai Precision Ind. Co. Ltd., Taipei Hsien (TW)

( * ) Notice: Subject to any disclaimer, the term of this patent is extended or adjusted under 35 U.S.C. 154(b) by 125 days.

(21) Appl. No.: 10/425,294

(22) Filed: Apr. 28, 2003

(65) Prior Publication Data
US 2004/0124752 A1  Jul. 1, 2004

(30) Foreign Application Priority Data
Dec. 31, 2002 (TW) ............................. 91221595 U

(51) Int. Cl.
    *A47B 97/00* (2006.01)
    *H05K 7/14* (2006.01)
(52) U.S. Cl. .................... 312/223.2; 361/683; 361/801
(58) Field of Classification Search ............ 312/223.1, 312/223.2; 211/13.1, 41.17; 248/221.11, 248/674; 439/325; 361/684, 686, 724, 801
See application file for complete search history.

(56) References Cited

U.S. PATENT DOCUMENTS

| | | | |
|---|---|---|---|
| 5,317,483 A * | 5/1994 | Swindler | ..................... 361/801 |
| 5,936,835 A * | 8/1999 | Astier | ........................ 361/683 |
| 6,182,835 B1 * | 2/2001 | Chen | ......................... 211/13.1 |
| 6,231,139 B1 * | 5/2001 | Chen | ....................... 312/223.2 |
| 6,608,765 B1 * | 8/2003 | Vier et al. | .................. 361/801 |
| 6,674,650 B1 * | 1/2004 | Davis et al. | ................ 361/796 |
| 2001/0053060 A1 * | 12/2001 | Gan | ........................... 361/683 |
| 2002/0075638 A1 * | 6/2002 | Chen | ......................... 361/683 |

FOREIGN PATENT DOCUMENTS

| | | | |
|---|---|---|---|
| DE | 19806026 | * | 9/1999 |
| TW | 281310 | | 7/1996 |
| TW | 322964 | | 12/1997 |
| TW | 333387 | | 6/1998 |

* cited by examiner

*Primary Examiner*—James O. Hansen
(74) *Attorney, Agent, or Firm*—Wei Te Chung

(57) ABSTRACT

A retention device (40) is for mounting a plurality of expansion cards (30) to a rear panel (10). A plurality of expansion slots (12) is defined in the rear panel and a plurality of receiving members (14) is formed the rear panel. Two aligned pivot (16) seats are formed in a right portion of the rear panel. Each expansion card includes a metal plate (32) having a bent portion (36) and an inserting portion (34) received in a corresponding receiving member. The retention device is pivotably mounted between the two pivot seats of the rear panel. The retention device includes a pressing portion (42) and a resilient portion (44) connecting with opposite ends of the pressing portion. In assembly, the pressing portion presses against the bent portion of the metal plates toward the receiving member, and the resilient portion detachably engage with the rear panel.

7 Claims, 3 Drawing Sheets

RETENTION DEVICE FOR EXPANSION CARDS

BACKGROUND OF THE INVENTION

1. Field of the Invention

The present invention relates to a retention device for mounting a plurality of expansion cards to a rear panel, and in particular to a retention device which can conveniently mount a plurality of expansion cards to a rear panel.

2. Description of Prior Art

With the continued development of computers, a wide variety of optional extra devices are available for adding to a computer to increase its performance and functions. Expansion cards are the most common add-on devices used to enhance computers. Almost all personal computers can use any of a variety of expansion cards such as network cards, sound cards, and SCSI (small computer system interface) cards. Consequently, a typical computer enclosure is configured to have a number of expansion slots that allow users to install optional expansion cards.

Conventionally, expansion cards are directly secured in a computer enclosure one by one, using bolts. Each expansion card needs one bolt. Fastening or detachment of the bolts is unduly time-consuming and laborious. This retards the efficiency of installation and removal of the expansion cards. These problems are multiplied in mass production facilities, and result in increased costs. Examples of the abovementioned means for securing expansion cards are found in Taiwan Patent Application Nos. 84206442, 85218324 and 87200066.

A retention device which overcomes the above-mentioned problems is desired.

BRIEF SUMMARY OF THE INVENTION

Accordingly, an object of the present invention is to provide a retention device for conveniently mounting a plurality of expansion cards to a rear panel of a computer.

To achieve the above object, a retention device in accordance with a preferred embodiment of the present invention is for mounting a plurality of expansion cards to a rear panel. The rear panel defines a plurality of expansion slots and receiving members therein. Each of the expansion cards has a metal plate positioned at a rear end thereof. The metal plate comprises a bent portion and an inserting portion received in a corresponding receiving member. Two aligned pivot seats are formed in the rear panel and two holes are defined in the rear panel. The retention device comprises a pressing portion and a resilient portion connecting with opposite ends of the pressing portion. Two hooks are formed in the resilient portion. The pressing portion is pivotably mounted between the two pivot seats of the rear panel. In assembly, the pressing portion of the retention device presses against the bent portions of the metal plates in a direction toward the receiving members. The two hooks of the resilient portion are detachably engaged with the two holes of the rear panel.

Other objects, advantages and novel features of the present invention will be drawn from the following detailed description of a preferred embodiment of the present invention with the attached drawings, in which:

DETAILED DESCRIPTION OF THE INVENTION

Figure 1:
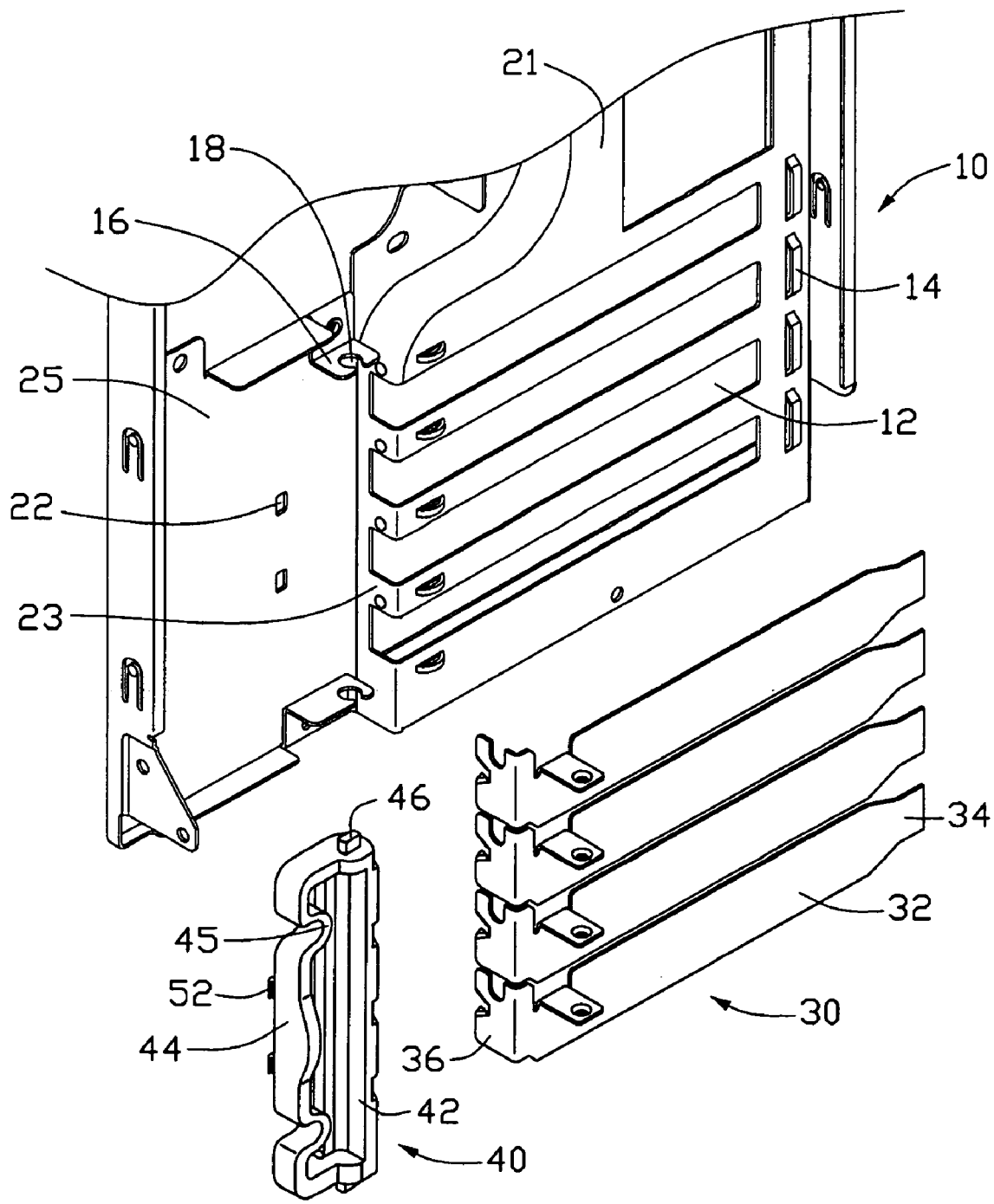
FIG. 1 is an exploded, isometric view of a retention device and associated equipment in accordance with the preferred embodiment of the present invention.

Referring to FIG. 1, a retention device 40 in accordance with the preferred embodiment of the present invention is used for mounting a plurality of expansion cards 30 to a rear panel 10 of a computer enclosure.

Each expansion card 30 comprises a metal plate 32 attached on a rear end thereof. The metal plate 32 comprises a tapered inserting portion 34 formed at one end thereof, and a bent portion 36 formed at an opposite end thereof.

A plurality of expansion slots 12 is defined in a bottom left portion of the rear panel 10 (as viewed from outside the rear panel 10) and generally mainly located in a main plane 21 of the rear panel 10. A plurality of receiving members 14 is formed on the rear panel 10 between corresponding ends of the expansion slots 12 and a left extremity of the rear panel 10. Two aligned pivot seats 16 are formed in a right portion of the rear panel 10 at top and bottom ends of the plurality of expansion slots 12 respectively. Each pivot seat 16 defines a pivoting cutout 18. Two square holes 22 are defined in a right portion of the rear panel 10 and generally on a secondary plane 25 thereof, to the right of but generally between the pivot seats 16. A support platform 23 is perpendicularly connected between the main plane 21 and the secondary plane 25 and integrally formed with at least one of the main plane 21 and the secondary plane 25.

Figure 2:
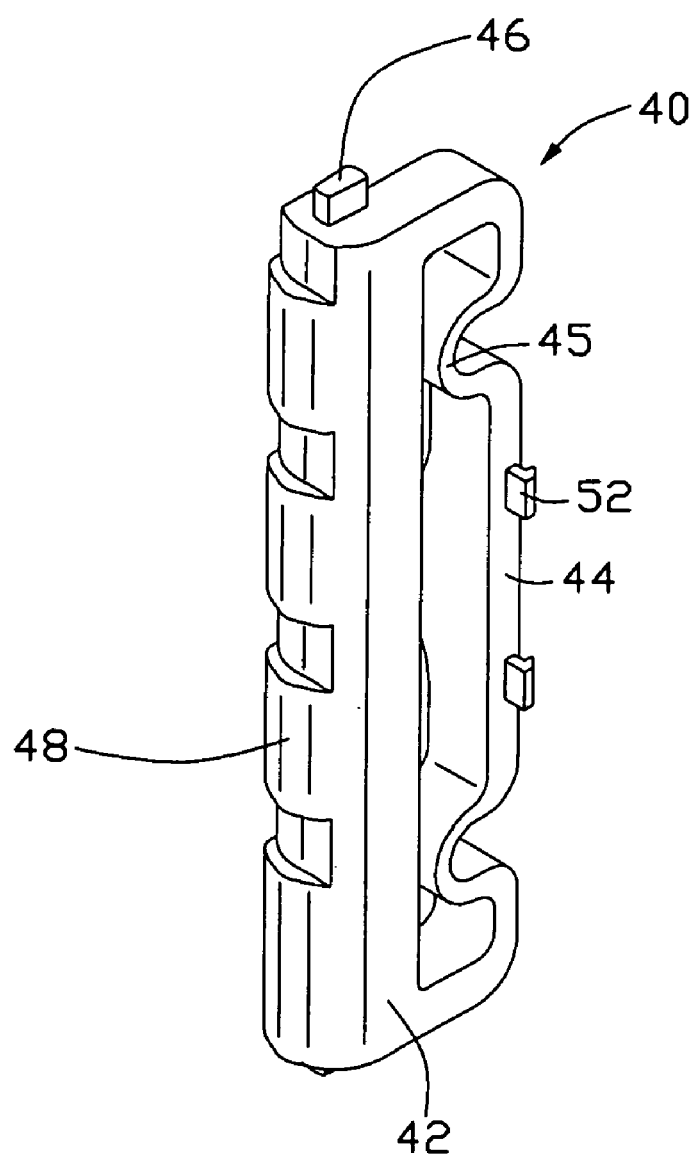
FIG. 2 is an enlarged view of a fastening device of the retention device of FIG. 1, viewed from another aspect.

Referring also to FIG. 2, the retention device 40 is made of resilient material such as plastic. The retention device 40 comprises a pressing portion 42, and a resilient portion 44 connecting with opposite ends of the pressing portion 42. Two pivoting posts 46 extend from the opposite ends of the pressing portion 42 respectively, for engaging in the corresponding pivoting cutouts 18 to pivotably attach the retention device 40 to the rear panel 10. The pressing portion 42 comprises a plurality of pressing blocks 48 projecting therefrom, corresponding to the metal plates 32 of the expansion cards 30. The resilient portion 44 comprises a pair of U-shaped sections 45 at the opposite ends thereof respectively, for improving an elasticity thereof. Two hooks 52 are formed on the resilient portion 44 between the U-shaped sections 45, for engaging in the holes 22 of the rear panel 10.

Figure 3:
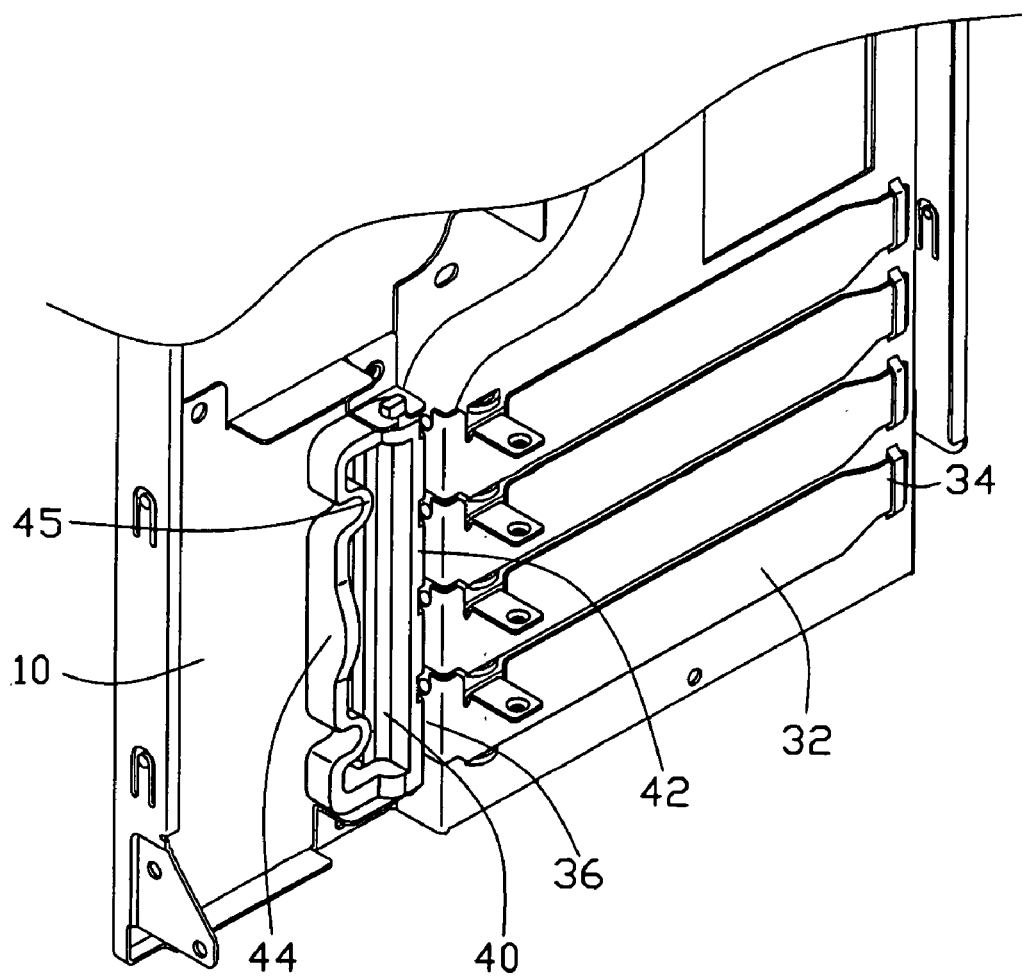
FIG. 3 is an assembled view of FIG. 1.

Referring to FIG. 3, in assembly, the expansion cards 30 are attached to the rear panel 10 at the corresponding expansion slots 12. The inserting portion 34 of the metal plate 32 of each expansion card 30 is received in a corresponding receiving member 14, and the bent portion 36 abuts the rear panel 10 at an end of the corresponding expansion slot 12 distal from the receiving member 14. The pivoting posts 46 of the retention device 40 are pivotably engaged in the pivoting cutouts 18 of the pivot seats 16. Then the retention device 40 is rotated until the hooks 52 are engaged in the corresponding holes 22. The pressing blocks 48 press against the bent portions 36 of the metal plates 32 in a direction toward the receiving members 14. Thus the expansion cards 30 are securely attached to the rear panel 10.

In disassembly, the resilient portion 44 is pressed to release the hooks 52 from the holes 22. The retention device 40 is rotated to release the pressing portion 42 from the bent portions 36 of the metal plates 32. The expansion cards 30 are then readily removed from the rear panel 10.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. An enclosure for mounting expansion cards therein, each of the expansion cards comprising a bent portion, the enclosure comprising:

a rear panel defining a plurality of expansion slots for receiving corresponding expansion cards, a pair of seats each defining a pivoting cutout being formed on the rear panel at one side of the expansion slots, the seats respectively located near two outmost expansion slots; and a retention device comprising two pivoting posts extending from two opposite ends of the retention device, the pivoting posts being pivotably received in the pivoting cutouts of the seats, the retention device comprising a pressing portion and a resilient portion is respectively located at an inner side facing the bent portions of the expansion cards by means of a locking device, wherein an opposing outer side of the retention device, wherein the retention device is pivotable between a first position in which the resilient portion elastically deformed to engage with the rear panel and the pressing portion presses against the bent portions of the expansion cards, and a second position in which the resilient portion is released from the rear panel and the pressing portion is free from the bent portions of the expansion cards.

2. The enclosure as claimed in claim 1, wherein the rear panel further defines a plurality of holes, and the resilient portion comprises a plurality of hooks engaging in the holes in the first position.

3. The enclosure as claimed in claim 1, wherein the retention device is made of plastic.

4. An enclosure assembly comprising:

a rear panel having a plurality of expansion slots extending therethrough in a first direction, and forming a support platform located on an inner side thereof and extending along a second direction perpendicular to said first direction and substantially above said expansion slots, each of said expansion slots being of an elongated configuration along a third direction perpendicular to both said first and second directions;

a plurality of expansion covers extending along the third direction and covering the corresponding expansion slots, respectively, each of said expansion covers including a bent portion seated upon the support platform; and a retention device pivotally mounted on said inner side of the rear panel, said retention device defining a pivotal axis along the second direction with a pressing block located on one side of said pivotal axis and downwardly pressing against the bent portions so as to cooperate with the support platform to sandwich said bent portions therebetween, and a resilient portion having a locking device located on the other side of said pivotal axis, the resilient portion being elastically deformable and detachably fastened to the rear panel by said locking device so as to hold the retention device in position without rotation.

5. The assembly as claimed in claim 4, wherein said rear panel defines a main plane with said expansion slots therein and a secondary plane parallel to said main plane, and said support platform is perpendicularly connected between said main plane and said secondary plane and integrally formed with at least one of said main plane and said secondary plane.

6. An enclosure assembly comprising:

a rear panel having a plurality of expansion slots extending therethrough in a first direction, and forming a support platform located on an inner side thereof and extending along a second direction perpendicular to said first direction and substantially above said expansion slots;

each of said expansion slots being of an elongated configuration along a third direction perpendicular to both said first and second directions;

a plurality of expansion covers extending along the third direction and covering the corresponding expansion slots, respectively, each of said expansion covers including a bent portion seated upon the support platform; and a retention device pivotally mounted on said inner side of the rear panel, said retention device defining a pivot axis, along the second direction, with a pressing block downwardly pressing against the bent portions so as to cooperate with the support platform to sandwich said bent portions therebetween, and a resilient portion having a locking device, resilient portion being elastically deformable and detachably fastened to the rear panel by said locking device so as to hold the retention device in position without rotation.

7. The assembly as claimed in claim 6, wherein said rear panel defines a main plane with said expansion slots therein and a secondary plane parallel to said main plane, and said support platform is perpendicular connected between said main plane and said secondary plane and integrally formed with at least one of said main plane and said secondary plane.

* * * * *